US011102097B2

(12) United States Patent
Degioanni et al.

(10) Patent No.: US 11,102,097 B2
(45) Date of Patent: Aug. 24, 2021

(54) COMMUNICATION BETWEEN INDEPENDENT CONTAINERS

(71) Applicant: Sysdig, Inc., San Francisco, CA (US)

(72) Inventors: Loris Degioanni, Davis, CA (US); Luca Marturana, Sicily (IT); Gianluca Borello, Davis, CA (US)

(73) Assignee: Sysdig, Inc., San Francisco, CA (US)

( * ) Notice: Subject to any disclaimer, the term of this patent is extended or adjusted under 35 U.S.C. 154(b) by 15 days.

(21) Appl. No.: 16/666,318

(22) Filed: Oct. 28, 2019

(65) Prior Publication Data

US 2020/0067802 A1 Feb. 27, 2020

Related U.S. Application Data

(63) Continuation of application No. 15/176,848, filed on Jun. 8, 2016, now Pat. No. 10,476,767.
(Continued)

(51) Int. Cl.
*H04L 12/26* (2006.01)
*G06F 21/55* (2013.01)
(Continued)

(52) U.S. Cl.
CPC ............... *H04L 43/08* (2013.01); *G06F 9/54* (2013.01); *G06F 11/34* (2013.01); *G06F 21/53* (2013.01);
(Continued)

(58) Field of Classification Search
CPC ..... H04L 43/08; H04L 41/0803; H04L 67/10; G06F 9/54; G06F 21/552; G06F 11/34;
(Continued)

(56) References Cited

U.S. PATENT DOCUMENTS 8,055,622 B1    11/2011    Botes et al.
2008/0040335 A1    2/2008    Gatti
(Continued)

OTHER PUBLICATIONS

"Docker Containers Monitoring", Scalingo, May 6, 2015, retrieved from the internet: https://web.archive.org/web/2015050600 3816/ http://blog.scalingo.com, on May 6, 2015, posted Apr. 27, 2015, 4 pgs (Year: 2015).*
(Continued)

*Primary Examiner* — Kevin T Bates
*Assistant Examiner* — Ranjan Pant
(74) *Attorney, Agent, or Firm* — Hickman Becker Bingham Ledesma LLP

(57) ABSTRACT

Techniques related to communication between independent containers are provided. In an embodiment, a first programmatic container includes one or more first namespaces in which an application program is executing. A second programmatic container includes one or more second namespaces in which a monitoring agent is executing. The one or more first namespaces are independent of the one or more second namespaces. A monitoring agent process hosts the monitoring agent. The monitoring agent is programmed to receive an identifier of the application program. The monitoring agent is further programmed to switch the monitoring agent process from the one or more second namespaces to the one or more first namespaces. After the switch, the monitoring agent process continues to execute in the second programmatic container, but communication is enabled between the application program and the monitoring agent via the monitoring agent process.

21 Claims, 8 Drawing Sheets

Related U.S. Application Data

(60) Provisional application No. 62/183,153, filed on Jun. 22, 2015.

(51) Int. Cl.
```
G06F 11/34      (2006.01)
G06F 21/53      (2013.01)
G06F 9/54       (2006.01)
H04L 12/24      (2006.01)
H04L 29/08      (2006.01)
```

(52) U.S. Cl.
CPC ........ *G06F 21/552* (2013.01); *H04L 41/0803* (2013.01); *H04L 67/10* (2013.01)

(58) Field of Classification Search
CPC .. G06F 21/53; G06F 11/3082; G06F 11/3055; G06F 11/301; G06F 2201/815; G06F 2201/865; G06F 11/3093; G06F 11/302
See application file for complete search history.

(56) References Cited

U.S. PATENT DOCUMENTS

| | | | |
|---|---|---|---|
| 2009/0313391 A1 | 12/2009 | Watanabe | |
| 2011/0161988 A1* | 6/2011 | Kashyap | G06F 9/544 719/319 |
| 2013/0124807 A1* | 5/2013 | Nielsen | G06F 11/1438 711/162 |
| 2015/0120928 A1 | 4/2015 | Gummaraju | |
| 2015/0150003 A1 | 5/2015 | Emelyanov | |
| 2016/0094647 A1 | 3/2016 | Mordani | |
| 2016/0162320 A1* | 6/2016 | Singh | G06F 9/5005 718/1 |
| 2016/0219019 A1 | 7/2016 | Mathur | |
| 2016/0330073 A1 | 11/2016 | Li | |
| 2016/0373327 A1 | 12/2016 | Degioanni et al. | |
| 2016/0378545 A1* | 12/2016 | Ho | G06F 9/46 718/107 |
| 2018/0123928 A1 | 5/2018 | Moiradi | |

OTHER PUBLICATIONS

Unbekandt, Leo, "Docker containers monitoring", dated May 6, 2015, 2 pages.

Korean Intellectual Property, "Office Notice of Allowance", in application No. 10-2018-7001544, dated Apr. 23, 2020, 2 pages.

Korean Claims in application No. 10-2018-7001544, dated Apr. 2020, 5 pages.

Wikipedia, "Nagios", https://en.wikipedia.org/wiki/Nagios, last viewed on Aug. 8, 2016, 5 pages.

Wikipedia, "Docker (software)", https://en.wikipedia.org/wiki/Docker_(software), last viewed on Aug. 8, 2016, 6 pages.

Wikipedia, "CoreOS", https://en.wikipedia.org/wiki/CoreOS, last viewed on Aug. 8, 2016, 7 pages.

Wikipedia, "Collectd", https://en.wikipedia.org/wiki/Collectd, last viewed on Aug. 8, 2016, 3 pages.

Style Hatch, http://stylehatch.co, "Docker Containers Monitoring, Scalingo", retrieved from the internet: https://web.archive.org/web/20150506003816/http://blog.scalingo.com, dated May 6, 2015, 6 pgs.

Scalingo, "Docker Containers Monitoring", dated May 6, 2015, https://web.archive.org/web20150506003816/http://blog.scaling.com, 4 pages.

Koller et al., "Unified Monitoring and Analytics in the Cloud", Hotcloud'15 Proceedings of the 7th Usenix Conference on Hot Topics in Cloud Computing, dated Jul. 6, 2015, 6 pages.

European Patent Office, "Search Report" in application No. PCT/US2016/036435, dated Aug. 1, 2016, 17 pages.

European Claims in application No. PCT/US2016/036435, dated Aug. 2016, 4 pages.

Degioanni, U.S. Appl. No. 15/176,848, filed Jun. 8, 2016, Office Action, dated Apr. 16, 2019.

Degioanni, U.S. Appl. No. 15/176,848, filed Jun. 8, 2016, Office Action, dated Apr. 18, 2018.

Degioanni, U.S. Appl. No. 15/176,848, filed Jun. 8, 2016, Notice of Allowance, dated Jun. 26, 2019.

Degioanni, U.S. Appl. No. 15/176,848, filed Jun. 8, 2016, Final Office Action, dated Jan. 24, 2019.

\* cited by examiner

COMMUNICATION BETWEEN INDEPENDENT CONTAINERS

BENEFIT CLAIM

This application claims the benefit as a continuation of U.S. application Ser. No. 15/176,848 filed Jun. 8, 2016; the entire contents of which is hereby incorporated by reference as if fully set forth herein, under 35 U.S.C. § 120; which claims priority to U.S. provisional application No. 62/183,153 filed Jun. 22, 2015, the entire contents of which is hereby incorporated by reference as if fully set forth herein, under 35 U.S.C. § 119(e).

FIELD OF THE DISCLOSURE

The present disclosure generally relates to computer-implemented processes that support inter-process communications. The disclosure relates more specifically to communication between independent containers and between applications that execute in isolation within independent containers.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Programmatic containers encapsulate computer program applications within individual, relatively isolated runtime environments. For example, a programmatic container may bundle into a single package an application program with its dependencies, libraries, and configuration files. Thus, programmatic containers enable portability across different operating systems and different hardware environments. In other words, programmatic containers provide many of the benefits of virtual machine instances. At the same time, programmatic containers use significantly fewer resources than virtual machine instances. For example, a programmatic container may be several megabytes in size, whereas a virtual machine instance may be several gigabytes in size.

One reason for this difference is that a programmatic container uses the operating system kernel of its host computer, whereas a virtual machine instance includes an entire operating system that runs on top of the operating system kernel of its host computer. This lightweight aspect of programmatic containers makes them popular alternatives to virtual machine instances for developing computer program applications. For example, a computer program application may be deployed at one or more times as a set of programmatic containers. Furthermore, each programmatic container may include a set of code that exhibits simplified dependencies and/or is otherwise streamlined for performance efficiency.

However, programmatic containers may impose constraints on inter-process communications. For example, different programmatic containers may have different namespaces. Thus, different programmatic containers may have different views of processes, networking interfaces, files, and/or any other system resource. As such, an application program in one programmatic container may be unable to receive data from a different application program in another programmatic container. For example, if different programmatic containers fail to share a same network namespace, application programs in the different programmatic containers may be unable to communicate using local network connections.

One approach for avoiding the communication constraints of programmatic containers is to include multiple application programs in a single programmatic container. For example, a monitored program and a monitoring program may share a programmatic container, thereby enabling the monitoring program to receive data from the monitored program. However, this approach undercuts many advantages of programmatic containers over virtual machine instances. For example, container density may significantly increase due to additional dependencies, libraries, and configuration files required to run additional programs. Running multiple programs in a high-density container may adversely affect performance by utilizing more computing and/or networking resources. Furthermore, if a monitoring program is to monitor multiple application programs in multiple programmatic containers, then each programmatic container may require a copy of the monitoring program. In such a case, it may be more efficient avoid using programmatic containers altogether.

Thus, there is a need for better ways of enabling communication between application programs in different programmatic containers.

SUMMARY

The appended claims may serve as a summary of the disclosure.

Figure 1:
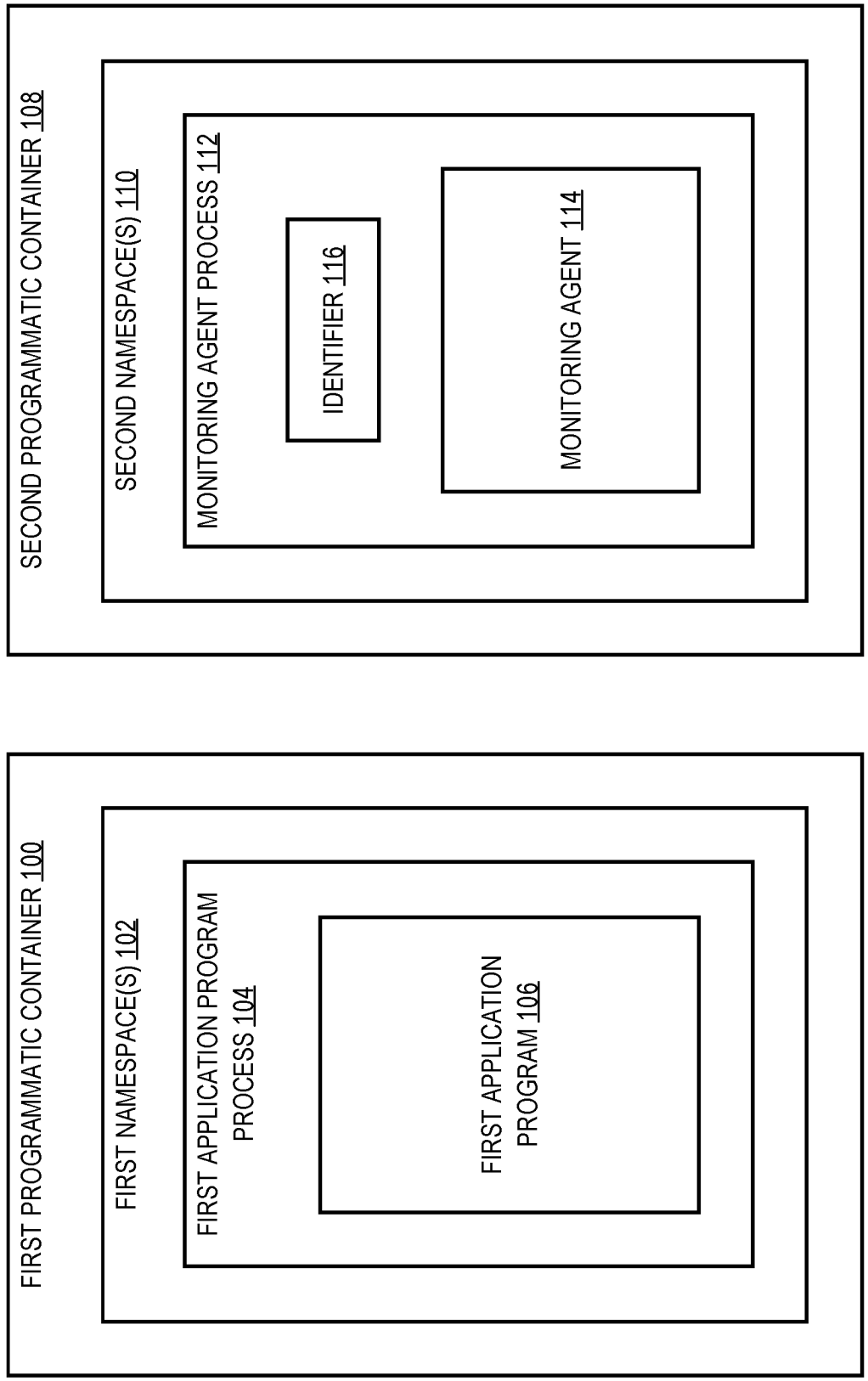
FIG. 1 depicts example programmatic containers that have independent namespaces.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" may be used to differentiate elements, but the modifiers do not necessarily indicate any particular order.

Embodiments are described herein according to the following outline:

| 1.0 | General Overview |
|---|---|
| 2.0 | Monitoring System |
| | 2.1 Monitored Program |
| | 2.2 Monitoring Agent |
| 3.0 | Network Namespace |
| | 3.1 Network Protocols |
| | 3.2 Shared Namespace |
| 4.0 | Mount Namespace |
| | 4.1 Multiple Shared Namespaces |
| | 4.2 Duplicate Files |
| | 4.3 Explicit Notifications |
| | 4.4 Intercepted Input/Output Calls |
| 5.0 | Aggregate Metrics |
| | 5.1 Multiple Monitored Programs |
| | 5.2 Metrics Display |
| 6.0 | Process Overview |
| | 6.1 Receiving a Target Identifier |
| | 6.2 Switching Namespaces |
| | 6.3 Receiving Monitoring Metrics |
| 7.0 | Implementation Example-Hardware Overview |
| 8.0 | Extensions and Alternatives |

1.0 General Overview

A monitoring system includes a monitored program and a monitoring agent. A monitored program process hosts the monitored program. A monitoring agent process hosts the monitoring agent.

The monitored program process is constrained to one or more first namespaces in a first programmatic container. The monitoring agent process is constrained to one or more second namespaces in a second programmatic container. The one or more first namespaces are independent of the one or more second namespaces. Thus, the monitoring agent process is unable to access the monitored program process when the monitoring agent process executes in the one or more second namespaces. For example, the monitoring agent process may be unable to establish a polling channel between the monitored program process and the monitoring agent process.

To enable communication between the monitored program process and the monitoring agent process, the monitoring agent process switches from the one or more second namespaces to the one or more first namespaces while continuing to execute in the second programmatic container. Thereafter, the monitoring agent process receives data from the monitored program process. In some example embodiments, the data includes one or more monitoring metrics.

2.0 Monitoring System

FIG. 1 depicts example programmatic containers that have independent namespaces. For the sake of illustration, the example programmatic containers of FIG. 1 are related to a monitoring system. However, the present disclosure is not limited to monitoring systems. The techniques disclosed herein are equally applicable to communicating any other data between programmatic containers.

A monitoring system includes a monitored program, such as first application program 106, and a monitoring agent, such as monitoring agent 114. Typically, the monitoring agent is programmed to poll metrics from one or more monitored programs. Examples of metric polling include getting data from a monitored program's management web interface to retrieve the monitored program's status, establishing a local socket connection to check an infrastructure component's availability, opening a directory to determine a number of files, reading information from a file, and retrieving information from a pipe or a Unix socket.

2.1 Monitored Program

The monitoring system of FIG. 1 includes first application program 106. First application program 106 is a set of instructions that may be executed on any of a number of computing devices. For example, first application program 106 may be a smartphone app, a web application, or a set of instructions that execute on a network device, such as a router or server.

Referring to FIG. 1, first application program process 104 hosts first application program 106. Thus, first application program process 104 is an instance of first application program 106 executing on a computing device.

First namespace(s) 102 constrains first application program process 104. A namespace may include a set of symbols that are assigned to a set of system resources. Example namespaces include process identifier (PID) namespaces, network namespaces, and mount namespaces. For example, first namespace(s) 102 may include a PID namespace in which first application program process 104 is referenced as PID 1.

First programmatic container 100 includes first namespace(s) 102. Thus, if first namespace(s) 102 includes a PID namespace and first programmatic container 100 is migrated between hosts, then first application program process 104 continues to be referenced as PID 1.

2.2 Monitoring Agent

The monitoring system of FIG. 1 further includes monitoring agent 114. Monitoring agent 114 is a set of instructions that cause collecting data from a monitored program. In some example embodiments, monitoring agent 114 may include a monitoring script that performs data collection. Like first application program 106, monitoring agent 114 may be executed on any of a number of computing devices.

In the example of FIG. 1, monitoring agent process 112 hosts monitoring agent 114. Monitoring agent process 112 may be an executing instance of monitoring agent 114 that has been provided with identifier 116 as an argument. Identifier 116 corresponds to first application program 106. For example, identifier 116 may be an alphanumeric string that uniquely identifies first application program 106. In some example embodiments, monitoring agent process 112 may include an executing script as a subprocess.

Second namespace(s) 110 constrains monitoring agent process 112. Second namespace(s) 110 is independent of first namespace(s) 102. In other words, it is impossible to derive first namespace(s) 102 from second namespace(s) 110 and vice versa. For example, a pair of namespaces that are independent of each other fail to exhibit a parent-child relationship with each other.

Second programmatic container 108 includes second namespace(s) 110. Second programmatic container 108 is independent of first programmatic container 100. Thus, second programmatic container 108 excludes first programmatic container 100 and vice versa.

3.0 Network Namespace

Figure 2:
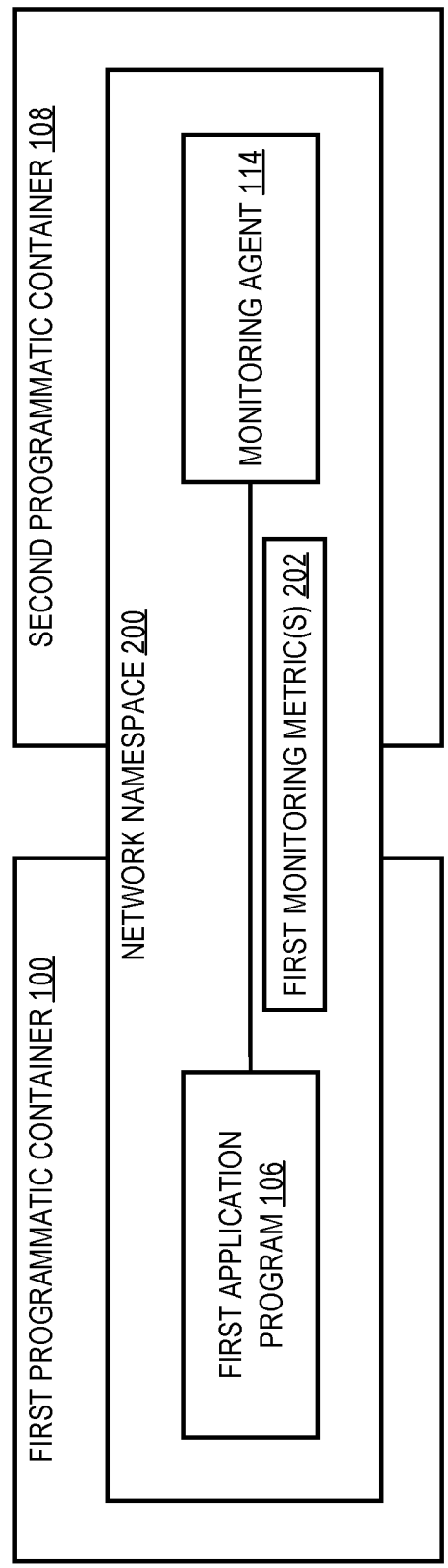
FIG. 2 depicts an approach for sharing a network namespace.

As mentioned above, isolating processes in independent namespaces hinders communication between the processes. Thus, an approach for enabling the communication involves the processes sharing a common namespace. In some example embodiments, the common namespace may be a network namespace. FIG. 2 depicts an approach for sharing a network namespace.

A network namespace, such as network namespace 200, has its own view of network devices, Internet Protocol (IP) addresses, IP routing tables, port numbers, and/or any other system resource related to networking. For example, a physical Ethernet device may be available in first namespace(s) 102 and unavailable in second namespace(s) 110. This is problematic for some network protocols.

3.1 Network Protocols

In some example embodiments, metric polling involves communication between first application program 106 and monitoring agent 114 based on Transmission Control Protocol (TCP) or User Datagram Protocol (UDP). However, both of these network protocols involve creating network or Unix sockets based on IP addresses and port numbers. As mentioned above, different network namespaces may have different views of IP addresses and port numbers. In particular, establishing localhost connections or Unix socket connections across different network namespaces may be impossible. Thus, monitoring agent process 112, or a subprocess thereof, may be unable to create a socket for communication with first application program process 104.

3.2 Shared Namespace

TCP or UDP communication may be enabled between first application program process 104 and monitoring agent process 112 when first programmatic container 100 and second programmatic container 108 share a common view of network resources. Thus, monitoring agent process 112 may switch from second namespace(s) 110 to first namespace(s) 102 while continuing to execute in second programmatic container 108. For example, the setns( ) Linux kernel system call allows a calling process to join an existing namespace. Alternatively, monitoring agent process 112 may invoke nsenter( ) or any other tool that leverages setns( ). Although monitoring agent process 112 continues to execute in second programmatic container 108, monitoring agent process 112, or a subprocess thereof, may establish network connections, send data, and/or receive data as if monitoring agent process 112, or the subprocess thereof, executes in first programmatic container 100.

Referring to FIG. 2, network namespace 200 may be included in first namespace(s) 102 of FIG. 1. When first programmatic container 100 and second programmatic container 108 share network namespace 200, first monitoring metric(s) 202 may be communicated between first application program 106 and monitoring agent 114. Example monitoring metrics include status information about first application program 106, availability of first application program 106, and a number of files accessible to first application program 106.

4.0 Mount Namespace

A mount namespace isolates one or more filesystem mount points seen by a process. A filesystem is a collection of files, such as a library file, a configuration file, a log file, an executable file, a dependency, and/or a framework component. A filesystem is represented as a hierarchy of directories that is used to organize the collection of files. An additional filesystem may be logically attached to the hierarchy of directories based on mounting the additional filesystem on a directory. This directory is known as a mount point that becomes a root directory for the additional filesystem. Thus, processes in different mount namespaces may have different views of files. In other words, a particular file may be available in first namespace(s) 102 and unavailable in second namespace(s) 110 or vice versa.

In some example embodiments, metric polling involves communication between first application program 106 and monitoring agent 114 based on a file or pipe poll. As mentioned above, different mount namespaces may have different views of files and, thus, data channels referenced by those files. For example, the read end of a pipe may be referenced by a file that is available in first namespace(s) 102 but unavailable in second namespace(s) 110. Thus, monitoring agent process 112, or a subprocess thereof, may be unable to read data from the pipe.

Enabling inter-process communication across independent programmatic containers may involve sharing a mount namespace between processes. Communication may be enabled between first application program 106 and monitoring agent 114 when first programmatic container 100 and second programmatic container 108 share a common view of files. Thus, monitoring agent process 112 may switch from second namespace(s) 110 to first namespace(s) 102 while continuing to execute in second programmatic container 108. This may be accomplished based on invoking setns( ), nsenter( ), or any other command for switching namespaces. Thereafter, first monitoring metric(s) 202 may be communicated between first application program 106 and monitoring agent 114 via a polling channel established in first namespace(s) 102.

4.1 Multiple Shared Namespaces

However, injecting a process into a programmatic container's mount namespace may prevent the programmatic container from shutting down properly. For example, the process that was injected may avoid being terminated, because a PID namespace in the programmatic container fails to account for the process. Thus, in some example embodiments, monitoring agent process 112 may switch to multiple namespaces in first programmatic container 100. For example, monitoring agent process 112 may switch to both a mount namespace and a PID namespace in first programmatic container 100. When monitoring agent process 112 switches to the PID namespace in first programmatic container 100, a PID is assigned to monitoring agent process 112 and added to the PID namespace. Thus, first programmatic container 100 may be shut down by sending a termination signal to all processes in the PID namespace.

4.2 Duplicate Files

Unless a programmatic container includes multiple mount namespaces, switching a process from an initial mount namespace to a different mount namespace may cause the process to lose access to files in the initial mount namespace. For example, after switching to a different mount namespace, monitoring agent process 112 may be unable to access files, such as executables and/or libraries, that are necessary for proper functioning. In some example embodiments, the files may include a monitoring script of monitoring agent 114.

Figure 3:
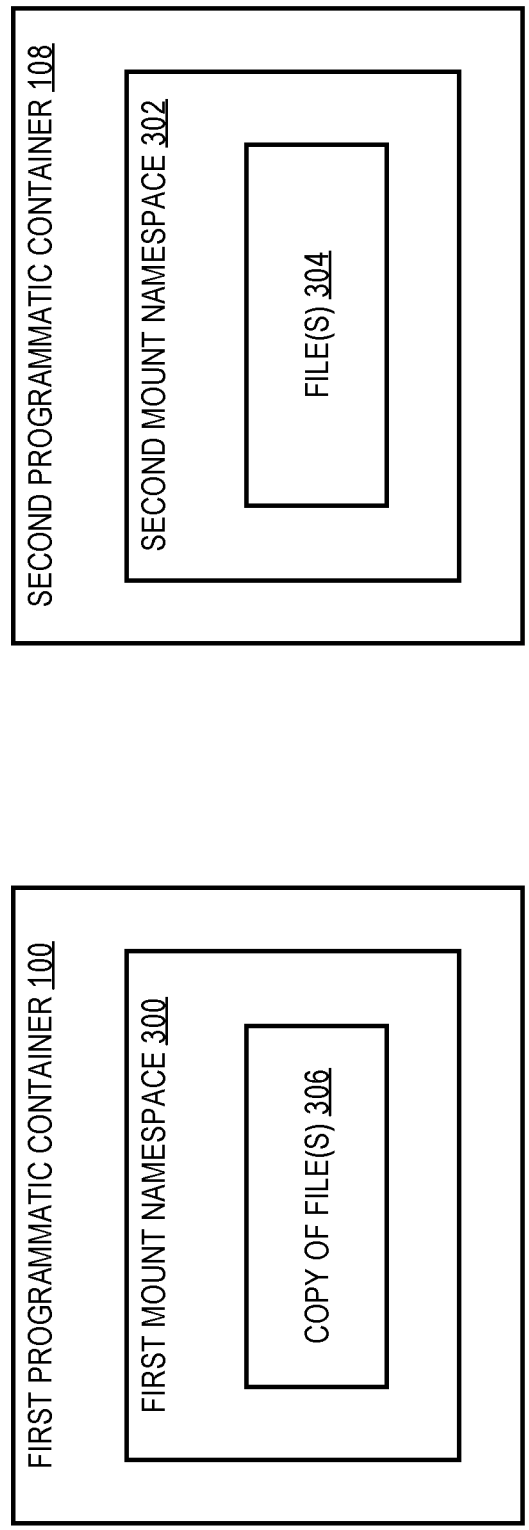
FIG. 3 depicts an approach for sharing a mount namespace using duplicate files.

To ensure proper functioning, one or more files may be copied into the different namespace. FIG. 3 depicts an approach for sharing a mount namespace using duplicate files. Referring to FIG. 3, monitoring agent process 112 opens file(s) 304 in second mount namespace 302 in second programmatic container 108. Monitoring agent process 112 then switches to first mount namespace 300. Thus, one or more file descriptors for file(s) 304 are valid in both first mount namespace 300 and second mount namespace 302. Copy of file(s) 306 are read from the one or more file descriptors and saved in first mount namespace 300. Copy of file(s) 306 are used in first programmatic container 100 to properly configure and initiate data export in first application program 106. For example, copy of file(s) 306 may be executed in a PID namespace in first programmatic container 100 to properly configure and initiate metrics export. Monitoring agent process 112 may execute in second programmatic container 108 to poll exported data. For example, monitoring agent process 112 may poll exported metrics based on leveraging the setns( ) system call to create localhost connections within network namespace 200 in first programmatic container 100.

4.3 Explicit Notifications

As mentioned above, a polling channel may be established between programmatic containers based on permanently switching a process to a shared namespace. However, permanently switching namespaces may adversely impact container functionality and/or introduce security issues. Thus, in some example embodiments, namespace switching may be temporary. For example, namespace switching may be performed on an "as-needed" basis. Thus, monitoring agent process 112 may switch from second mount namespace 302 to first mount namespace 300 when monitoring agent process 112, or a subprocess thereof, requires access to a filesystem in first mount namespace 300. Thereafter, monitoring agent process 112 may switch back from first mount namespace 300 to second mount namespace 302.

Figure 4:
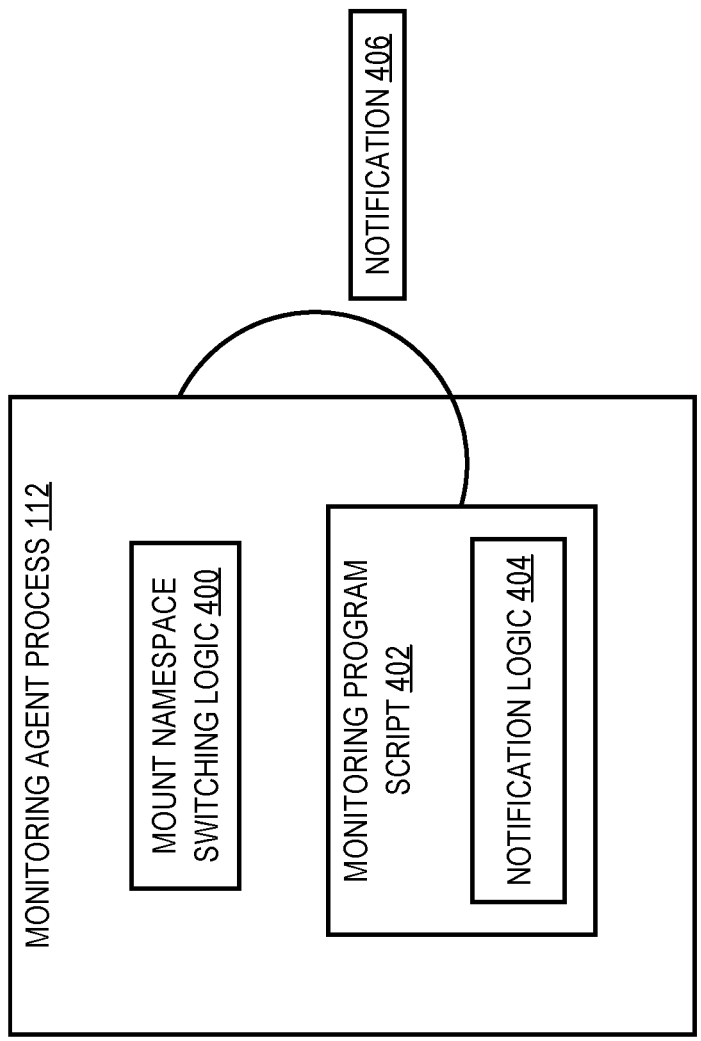
FIG. 4 depicts an approach for sharing a mount namespace based on explicit notifications.

In some example embodiments, monitoring agent process 112 may receive an explicit notification that a subprocess thereof, such as a monitoring script, requires access to a filesystem in first mount namespace 300. FIG. 4 depicts an approach for sharing a mount namespace based on explicit notifications.

Referring to FIG. 4, monitoring agent process 112 includes mount namespace switching logic 400 and monitoring program script 402. Mount namespace switching logic 400 may include setns( ), nsenter( ), or any other command for switching namespaces. Monitoring program script 402 may be running as a subprocess of monitoring agent process 112 to query first application program process 104 and/or create first monitoring metric(s) 202. For example, monitoring program script 402 may include a poll( ) command that periodically inspects the read end of a pipe.

In the example of FIG. 4, monitoring program script 402 has been modified to include notification logic 404. Notification logic 404 includes one or more instructions for sending notification 406 to monitoring agent process 112. Notification 406 may include an indication that monitoring program script 402 requires to read or write in a filesystem of first mount namespace 300. In some example embodiments, monitoring agent 114 may also be modified to include logic that processes notification 406. For example, monitoring agent 114 may be programmed to collect a predetermined number of notifications corresponding to multiple input/output (I/O) calls. As a result, monitoring agent process 112 may perform a single setns( ) system call for the multiple I/O calls.

4.4 Intercepted Input/Output Calls

Figure 5:
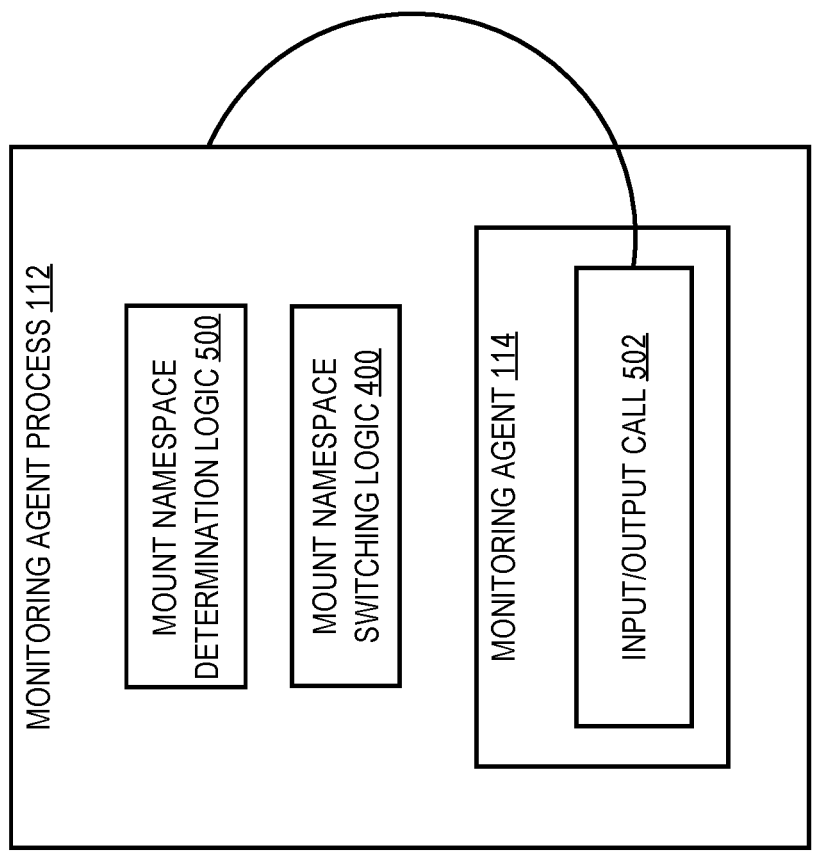
FIG. 5 depicts an approach for sharing a mount namespace based on intercepting input/output calls.

As mentioned above, explicitly notifying monitoring agent process 112 of a need to switch mount namespaces involves modifying at least monitoring program script 402 or some other portion of monitoring agent 114 that is programmed to make I/O calls. However, in some example embodiments, a monitoring system may include a polling framework that is provided by a third party. Thus, modifying the polling framework may be difficult and/or undesirable. In such cases, instead of relying on explicit notifications of I/O calls, monitoring agent process 112, or a subprocess thereof, may be instrumented to intercept its I/O calls. FIG. 5 depicts an approach for sharing a mount namespace based on intercepting I/O calls.

Referring to FIG. 5, monitoring agent 114 includes input/output call 502. Monitoring agent 114 and input/output call 502 are parts of an existing polling framework that remains unmodified. Input/output call 502 may be a system call and/or a library routine that requires access to a filesystem. Example I/O calls include stat( ), fstat( ), read( ), fread( ), write( ), fwrite( ), getdents( ), and readdir( ).

Instead of modifying any part of monitoring agent 114, monitoring agent process 112 may be instrumented to intercept input/output call 502. For example, instrumentation may involve overriding input/output call 502 using the LD_PRELOAD dynamic library injection technique. In other words, instrumentation may cause generating an executable that performs additional operations corresponding to instructions injected into input/output call 502. Thus, when input/output call 502 is invoked, monitoring agent process 112 may execute a custom implementation that includes these additional operations.

In the example of FIG. 5, the custom implementation includes mount namespace determination logic 500, mount namespace switching logic 400, and input/output call 502. Mount namespace determination logic 500 is programmed to determine whether input/output call 502 requires access to a filesystem in first mount namespace 300. If access to first mount namespace 300 is unnecessary, input/output call 502 executes in second mount namespace 302. Otherwise, mount namespace switching logic 400 causes switching monitoring agent process 112 from second mount namespace 302 to first mount namespace 300. Then, input/output call 502 executes in first mount namespace 300. Thereafter, monitoring agent process 112 switches back to second mount namespace 302.

An example custom implementation is provided in the pseudocode of TABLE 1:

TABLE 1

EXAMPLE PSEUDOCODE

```
open(pathnarme){
    if (pathname exists in a different mount namespace){
        switch to the different mount namespace;
        create a pointer to the original version of open( );
        call the original version of open( ) with pathname as an
        argument;
        switch back to the original mount namespace;
    }
    else{
        create a pointer to the original version of open( );
        call the original version of open( ) with pathname as an
        argument;
    }
}
```

Creating a pointer to an original version of a function may be implemented using dlsym( ) and RTLD_NEXT as a pseudo-handle. For example, the example custom implementation may include the C programming instruction "original_open=dlsym(RTLD_NEXT, 'open');".

FIG. 5 depicts monitoring agent process 112 as intercepting input/output call 502 of monitoring agent 114. However, in some example embodiments, a subprocess of monitoring agent process 112 may intercept input/output call 502 of a portion of monitoring agent 114. For example, an executing script may intercept input/output call 502 of monitoring program script 402.

5.0 Aggregate Metrics

Figure 6:
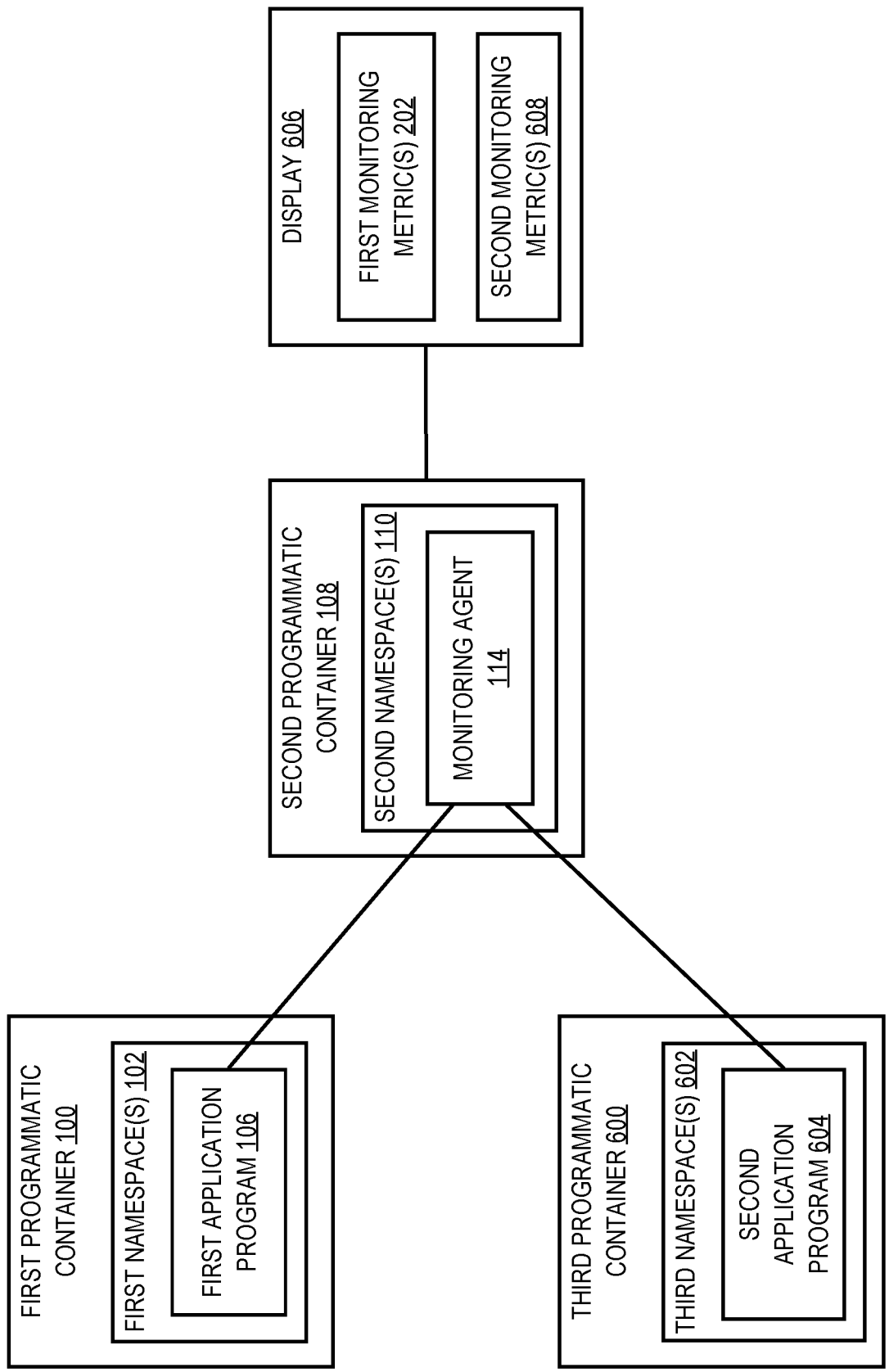
FIG. 6 depicts a monitoring agent that receives monitoring metrics from multiple programmatic containers.

Any of the aforementioned techniques may be used by a single programmatic container to monitor multiple programmatic containers. FIG. 6 depicts a monitoring agent that receives monitoring metrics from multiple programmatic containers. Although FIG. 6 depicts three programmatic containers, it should be appreciated that a monitoring system may include any number of programmatic containers.

5.1 Multiple Monitored Programs

Referring to FIG. 6, each programmatic container includes one or more respective namespaces. For example, each programmatic container may include a PID namespace, a network namespace, a mount namespace, and/or any other type of namespace. At a minimum, second namespace(s) 110 are independent of both first namespace(s) 102 and third namespace(s) 602. In some example embodiments, first namespace(s) 102 and third namespace(s) 602 may be independent of each other. First application program 106, monitoring agent 114, and second application program 604 are constrained to first namespace(s) 102, second namespace(s) 110, and third namespace(s) 602, respectively.

A communication channel may be established between a monitoring container and each monitored container in a plurality of monitored containers. In the example of FIG. 6, a first communication channel is established between first programmatic container 100 and second programmatic container 108. A second communication channel is established between second programmatic container 108 and third programmatic container 600. In some example embodiments, the first communication channel may be different from the second communication channel. For example, the first communication channel may be a TCP connection, and the second communication channel may be a pipe poll. In some example embodiments, the first communication channel may be similar to the second communication channel. For example, both communication channels may be UDP connections.

Multiple communication channels may be established based on multiple monitoring agent processes, or multiple subprocesses thereof, executing in second programmatic container 108. Each monitoring agent process/subprocess may receive data from a different programmatic container. For example, monitoring agent 114 may be programmed to fork a process or run a separate instance of a script when an identifier for an application program is passed to monitoring agent 114 as an argument.

5.2 Metrics Display

Each communication channel enables monitoring agent 114 to receive monitoring metrics from an application program. In the example of FIG. 6, first monitoring metric(s) 202 is collected from first programmatic container 100, and second monitoring metric(s) 608 is collected from third programmatic container 600. Monitoring agent 114 may be programmed to aggregate monitoring metrics prior to export. Exporting aggregated data reduces overhead related to inefficient use of network resources and/or computing resources otherwise involved in separately exporting monitoring metrics from each programmatic container.

Monitoring metrics may be exported to display 606, which enables visualization of monitoring metrics. In some example embodiments, a single computing device may host monitoring agent 114 and display 606. In some example embodiments, monitoring agent 114 and display 606 may be hosted on different computing devices. For example, a backend server may host display 606.

6.0 Process Overview

Figure 7:
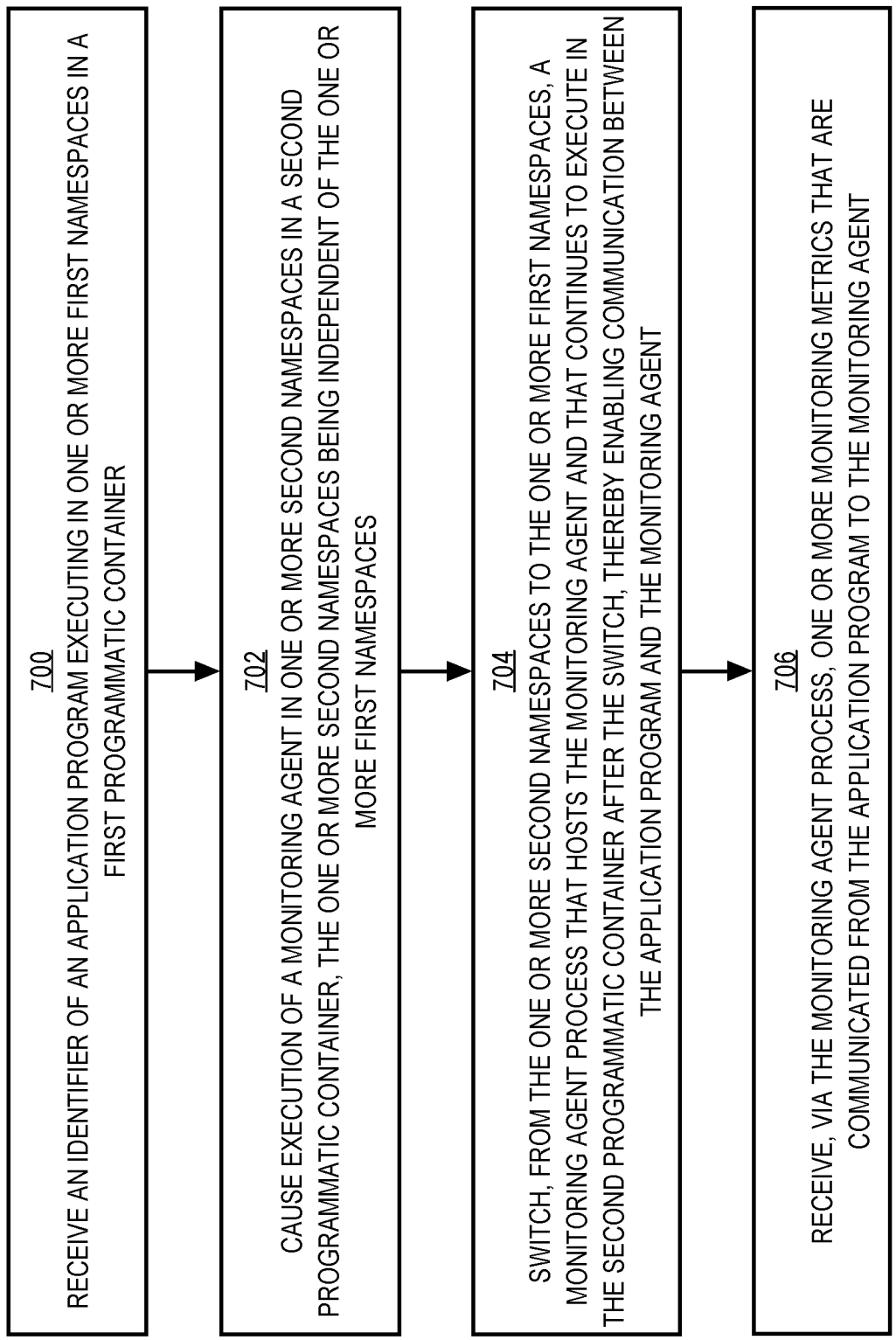
FIG. 7 is a flow diagram that depicts an approach for enabling communication between programmatic containers.

FIG. 7 is a flow diagram that depicts an approach for enabling communication between programmatic containers. Instructions that cause performance of the approach may be stored on one or more non-transitory storage media. One or more computing devices may perform the approach based on executing the instructions.

6.1 Receiving a Target Identifier

At block 700, a monitoring agent receives an identifier of an application program that is to be monitored. The identifier may be passed to the monitoring agent as an argument. The application program executes in one or more first namespaces in a first programmatic container.

At block 702, the monitoring agent executes in one or more second namespaces in a second programmatic container. The one or more first namespaces and the one or more second namespaces may include PID namespaces, network namespaces, mount namespaces, and/or any other namespaces. However, the one or more first namespaces and the one or more second namespaces are independent of each other.

6.2 Switching Namespaces

At block 704, a monitoring agent process, or a subprocess thereof, switches from the one or more second namespaces to the one or more first namespaces, thereby enabling communication between the application program and the monitoring agent. The monitoring agent process hosts the monitoring agent in the second programmatic container. Furthermore, the monitoring agent process continues to execute in the second programmatic container after the monitoring agent process switches to the one or more first namespaces.

In some example embodiments, the monitoring agent process switches permanently to the one or more first namespaces. For example, the monitoring agent process may switch to a PID namespace and a mount namespace of the application program. Additionally or alternatively, the monitoring agent process may copy one or more files from the one or more second namespaces into the one or more first namespaces.

In some example embodiments, the monitoring agent process temporarily switches to the one or more first namespaces in response to receiving a notification that a monitoring program script requires access to the one or more first namespaces. The monitoring program script may be a part of the monitoring agent that is programmed to collect data from the application program. Implementing this approach may involve modifying the monitoring program script to notify the monitoring agent process when the monitoring program script requires to read or write to a filesystem in the one or more first namespaces.

In some example embodiments, the monitoring agent process, or a subprocess thereof, temporarily switches to the one or more first namespaces in response to determining that a particular I/O call requires access to the one or more first namespaces. The monitoring agent process, or the subprocess thereof, may be instrumented to intercept its I/O calls. Implementing this approach avoids modifying the monitoring agent or a monitoring program script.

6.3 Receiving Monitoring Metrics

At block 706, the monitoring agent receives one or more monitoring metrics from the application program. The one or more monitoring metrics may be received via the monitoring agent process or a subprocess thereof. For example, the one or more monitoring metrics may be received via a communication channel that is established between a monitoring program script and an application program process that hosts the application program in the first programmatic container.

As mentioned above, in some example embodiments, the monitoring agent process temporarily switches from the one or more second namespaces to the one or more first namespaces. Thus, the monitoring agent process may switch back to the one or more second namespaces after receiving the one or more monitoring metrics.

In some example embodiments, after receiving the one or more monitoring metrics, the monitoring agent process causes updating a display to include the one or more monitoring metrics. The display may include a set of monitoring metrics corresponding to a plurality of different application programs executing in a plurality of different programmatic containers. Each different application program may execute in one or more respective namespaces that are independent of the one or more second namespaces.

7.0 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
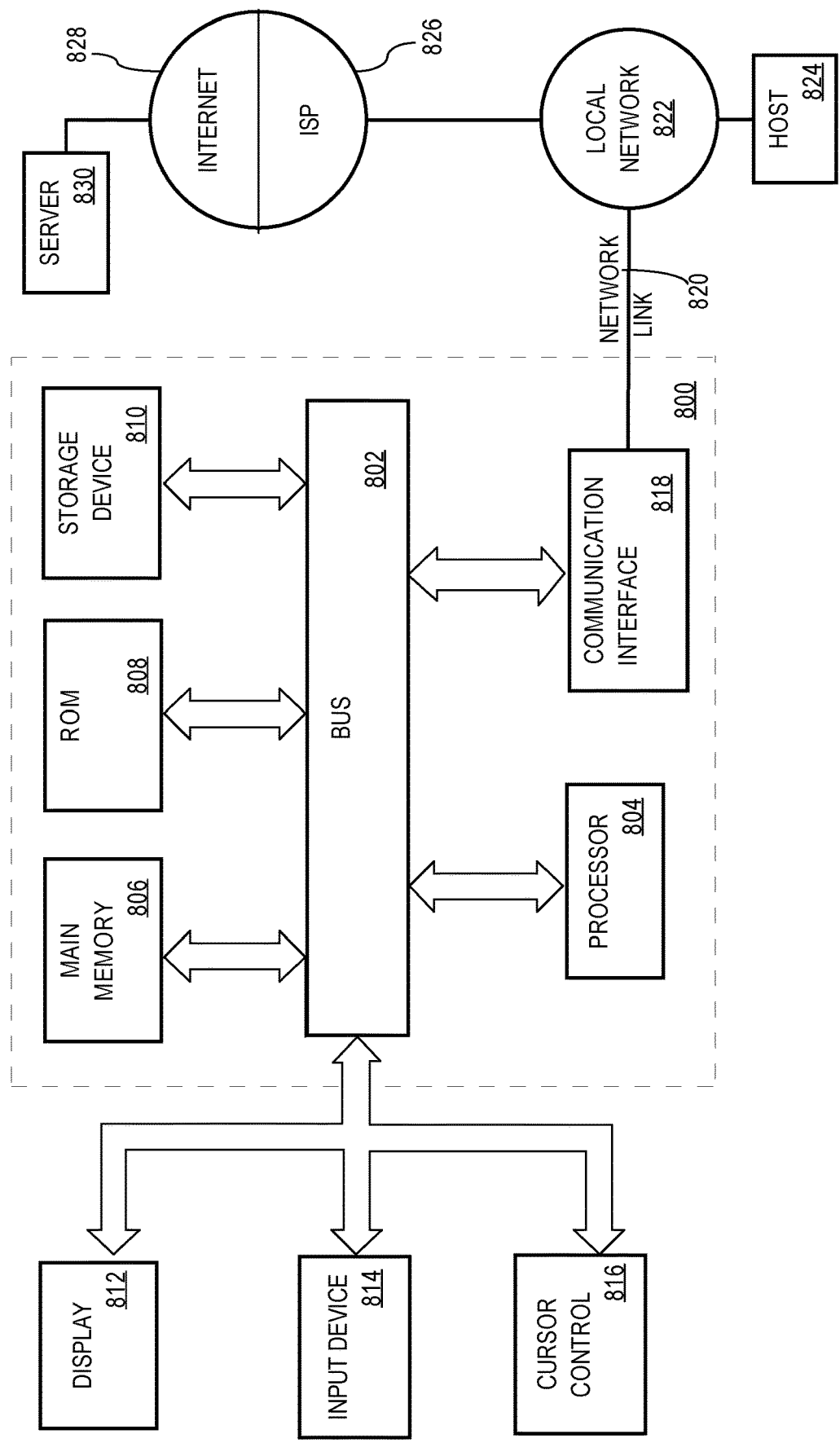
FIG. 8 depicts a computer system upon which an embodiment may be implemented.

For example, FIG. 8 is a block diagram that illustrates a computer system 800 upon which an embodiment of the disclosure may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

8.0 Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
  based on a monitoring process or a subprocess thereof intercepting a system call by a monitoring agent that requires access to a first mount namespace of a first programmatic container, the monitoring process or the subprocess thereof switching from a second mount namespace of a second programmatic container to the first mount namespace;
  wherein the monitoring agent and the monitoring process or the subprocess thereof continue to execute in the second programmatic container after the monitoring process or the subprocess thereof switches from the second mount namespace to the first mount namespace;
  the monitoring process or the subprocess thereof making the intercepted system call while the monitoring process or the subprocess thereof is switched from the second mount namespace to the first mount namespace;
  wherein the monitoring process or the subprocess thereof making the intercepted system call while the monitoring process or the subprocess thereof is switched from the second mount namespace to the first mount namespace causes the monitoring agent to receive one or more monitoring metrics pertaining to an application program executing in the first programmatic container while the monitoring agent executes in the second programmatic container; and
  wherein the method is performed by one or more computing devices.

2. The method of claim 1, further comprising the monitoring process or the subprocess thereof creating a pointer to the intercepted system call while the monitoring process or the subprocess thereof is switched from the second mount namespace to the first mount namespace.

3. The method of claim 1, wherein the monitoring process or the subprocess thereof is instrumented to intercept the system call by the monitoring agent.

4. The method of claim 1, wherein the monitoring process or the subprocess thereof is instrumented to intercept the system call by the monitoring agent using a LD_PRELOAD dynamic library injection technique.

5. The method of claim 1, wherein the system call is one of stat( ), fstat( ), read( ), fread( ), write( ), fwrite( ), getdents( ), or readdir( ).

6. The method of claim 1, further comprising the monitoring process or the subprocess thereof creating a pointer to the intercepted system call using dlsym( ) and RTLD_NEXT as a pseudo-handle while the monitoring process or the subprocess thereof is switched from the second mount namespace to the first mount namespace.

7. The method of claim 1, further comprising the monitoring process or the subprocess thereof switching back from the first mount namespace to the second mount namespace.

8. One or more non-transitory storage media storing instructions which, when executed by one or more computing devices, cause performing:
  based on a monitoring process or a subprocess thereof intercepting a system call by a monitoring agent that requires access to a first mount namespace of a first programmatic container, the monitoring process or the subprocess thereof switching from a second mount namespace of a second programmatic container to the first mount namespace;
  wherein the monitoring agent and the monitoring process or the subprocess thereof continue to execute in the second programmatic container after the monitoring process or the subprocess thereof switches from the second mount namespace to the first mount namespace;
  the monitoring process or the subprocess thereof making the intercepted system call while the monitoring process or the subprocess thereof is switched from the second mount namespace to the first mount namespace; and
  wherein the monitoring process or the subprocess thereof making the intercepted system call while the monitoring process or the subprocess thereof is switched from the second mount namespace to the first mount namespace causes the monitoring agent to receive one or more monitoring metrics pertaining to an application program executing in the first programmatic container while the monitoring agent executes in the second programmatic container.

9. The one or more non-transitory storage media of claim 8, further storing instructions which, when executed by the one or more computing devices, cause the monitoring process or the subprocess thereof creating a pointer to the intercepted system call while the monitoring process or the subprocess thereof is switched from the second mount namespace to the first mount namespace.

10. The one or more non-transitory storage media of claim 8, wherein the monitoring process or the subprocess thereof is instrumented to intercept the system call by the monitoring agent.

11. The one or more non-transitory storage media of claim 8, wherein the monitoring process or the subprocess thereof is instrumented to intercept the system call by the monitoring agent using a LD_PRELOAD dynamic library injection technique.

12. The one or more non-transitory storage media of claim 8, wherein the system call is one of stat( ), fstat( ), read( ), fread( ), write( ), fwrite( ), getdents( ), or readdir( ).

13. The one or more non-transitory storage media of claim 8, further storing instructions which, when executed by the one or more computing devices, cause the monitoring process or the subprocess thereof creating a pointer to the intercepted system call using dlsym( ) and RTLD_NEXT as a pseudo-handle while the monitoring process or the subprocess thereof is switched from the second mount namespace to the first mount namespace.

14. The one or more non-transitory storage media of claim 8, further storing instructions which, when executed by the one or more computing devices, cause the monitoring process or the subprocess thereof switching back from the first mount namespace to the second mount namespace.

15. A computing system comprising:
one or more processors;
storage media; and
instructions stored in the storage media and which, when executed by the one or more processors, cause performance of:
based on a monitoring process or a subprocess thereof intercepting a system call by a monitoring agent that requires access to a first mount namespace of a first programmatic container, the monitoring process or the subprocess thereof switching from a second mount namespace of a second programmatic container to the first mount namespace;
wherein the monitoring agent and the monitoring process or the subprocess thereof continue to execute in the second programmatic container after the monitoring process or the subprocess thereof switches from the second mount namespace to the first mount namespace;
the monitoring process or the subprocess thereof making the intercepted system call while the monitoring process or the subprocess thereof is switched from the second mount namespace to the first mount namespace; and
wherein the monitoring process or the subprocess thereof making the intercepted system call while the monitoring process or the subprocess thereof is switched from the second mount namespace to the first mount namespace causes the monitoring agent to receive one or more monitoring metrics pertaining to an application program executing in the first programmatic container while the monitoring agent executes in the second programmatic container.

16. The computing system of claim 15, further comprising instructions which, when executed by the one or more processors, cause performance of the monitoring process or the subprocess thereof creating a pointer to the intercepted system call while the monitoring process or the subprocess thereof is switched from the second mount namespace to the first mount namespace.

17. The computing system of claim 15, wherein the monitoring process or the subprocess thereof is instrumented to intercept the system call by the monitoring agent.

18. The computing system of claim 15, wherein the monitoring process or the subprocess thereof is instrumented to intercept the system call by the monitoring agent using a LD_PRELOAD dynamic library injection technique.

19. The computing system of claim 15, wherein the system call is one of stat( ), fstat( ), read( ), fread( ), write( ), fwrite( ), getdents( ), or readdir( ).

20. The computing system of claim 15, further comprising instructions which, when executed by the one or more processors, cause performance of the monitoring process or the subprocess thereof creating a pointer to the intercepted system call using dlsym( ) and RTLD_NEXT as a pseudo-handle while the monitoring process or the subprocess thereof is switched from the second mount namespace to the first mount namespace.

21. The computing system of claim 15, further comprising instructions which, when executed by the one or more processors, cause performance of the monitoring process or the subprocess thereof switching back from the first mount namespace to the second mount namespace.

* * * * *